(12) United States Patent
Li et al.

(10) Patent No.: US 8,947,035 B2
(45) Date of Patent: Feb. 3, 2015

(54) HEAT DISSIPATION SYSTEM, ROTATION SPEED CONTROL CIRCUIT AND METHOD THEREOF

(71) Applicant: Anpec Electronics Corporation, Hsinchu County (TW)

(72) Inventors: Ching-Sheng Li, Hsinchu County (TW); Shen-Min Lo, New Taipei (TW); Kun-Min Chen, Hsinchu (TW); Chia-Tai Yang, Tainan (TW); Ming-Jung Tsai, Changhua County (TW)

(73) Assignee: Anpec Electronics Corporation, Hsinchu (TW)

( * ) Notice: Subject to any disclaimer, the term of this patent is extended or adjusted under 35 U.S.C. 154(b) by 148 days.

(21) Appl. No.: 13/790,869

(22) Filed: Mar. 8, 2013

(65) Prior Publication Data

US 2014/0169982 A1 Jun. 19, 2014

(30) Foreign Application Priority Data

Dec. 19, 2012 (TW) ............................. 101148351 A

(51) Int. Cl.
*G05B 11/28* (2006.01)
*H02P 7/29* (2006.01)
*G05D 23/19* (2006.01)
*F04D 27/00* (2006.01)

(52) U.S. Cl.
CPC .............. *H02P 7/29* (2013.01); *G05D 23/1919* (2013.01); *F04D 27/004* (2013.01)
USPC ........... 318/599; 318/811; 318/471; 318/472; 318/779; 318/799; 361/679.48; 361/695; 388/811; 388/819; 388/823

(58) Field of Classification Search
CPC .................................. H02P 7/29; F04D 27/00
USPC .......... 318/599, 811, 400.01, 400.04, 400.07, 318/400.14, 808, 812, 268, 471, 472, 430, 318/432, 437, 779, 799; 388/811, 819, 823; 361/679.48, 695
See application file for complete search history.

(56) References Cited

U.S. PATENT DOCUMENTS 8,157,536 B2 4/2012 Teng et al.
2010/0054964 A1* 3/2010 Teng et al. .................... 417/326

* cited by examiner

*Primary Examiner* — Antony M Paul
(74) *Attorney, Agent, or Firm* — Rosenberg, Klein & Lee

(57) ABSTRACT

A rotation speed control circuit is disclosed. The rotation speed control circuit includes a temperature-controlled voltage duty generator, a pulse-width signal duty generator, a multiplier and a rotation speed signal generator. The temperature-controlled voltage duty generator converts temperature-controlled voltage to digital temperature-controlled voltage and executes linear interpolation operation according to a first setting data so as to output temperature-controlled voltage duty signal. The pulse-width signal duty generator coverts pulse-width input signal to a digital pulse-width input signal and executes linear interpolation operation according to a second setting data so as to output a pulse-width duty signal. The temperature-controlled voltage duty signal and the pulse-width duty signal are executed for multiplication by the multiplier so as to output mixing-duty signal. The rotation speed generator receives the mixing-duty signal and a third setting data, and executes a minimum output duty operation so as to output a pulse-width output signal.

16 Claims, 10 Drawing Sheets

HEAT DISSIPATION SYSTEM, ROTATION SPEED CONTROL CIRCUIT AND METHOD THEREOF

BACKGROUND OF THE DISCLOSURE

1. Field of the Disclosure

The instant disclosure relates to a heat dissipation system; in particular, to a heat dissipation system with a rotation speed control circuit.

2. Description of Related Art

In the modern society of information technology, a computer system has become one of indispensable information tools, and whether for a desktop personal computer (PC), a laptop PC, or server, a clock operation of a central processor is increasing, and which results in an increasing heat dissipation, and a demand for heat dissipation appears to be more and more important. In prior art, a fan is a mainly way for the heat dissipation, and under the consideration of energy-saving and noise reduction, there are multiple methods of controlling a rotation speed developed for the heat dissipation fan used for the central processor, wherein a special method is to use two sets of signal sources to control the rotation speed of the fan.

U.S. Pat. No. 8,157,536 disclosed a speed adjustment circuit and a control system for the heat dissipation fan. The control system for the heat dissipation fan consists of a rotation speed control circuit, a rotation speed control circuit, an AND gate, and a logic circuit. The rotation speed control circuit is for sensing a temperature of heat dissipation fan in order to generate a first temperature-controlled signal. The rotation speed control circuit is for receiving a system control signal to produce a second temperature-controlled signal. The AND gate is coupled to the rotation speed control circuit and the rotation speed control circuit, and is for conducting an operation on the first temperature-controlled signal and the temperature-controlled signal to produce a first control signal. The rotation speed control circuit includes a first node, a second node, a receiving end, a first resistor, a second resistor, a third resistor, a capacitor, a transistor, an oscillating signal generator and a comparator. The receiving end is coupled to the AND gate for receiving the first control signal. The first resistor has one end coupled to a voltage source and another end coupled to the first node. The second resistor has one end coupled to the first node, and another end coupled to the second node. The third resistor has one end coupled to the second node, and another end coupled to a ground terminal. The capacitor has one end coupled to the first node, and another end coupled to the ground terminal. The transistor includes a first end coupled to the receiving end, and a second end coupled to the second node, and a third end coupled to the ground terminal for controlling to a signal link from the second end to the third end according to the signal of the first end. The oscillation signal generator is for producing an oscillation signal. The comparator includes a first input terminal coupled to the first node, a second input terminal coupled to the oscillation signal generator, and an output terminal for comparing a signal of the first node and the oscillation signal and outputting a second control signal through the output terminal. The logic circuit is coupled to the output end of the comparator and the heat dissipation fan for driving the heat dissipation fan according to the second control signal.

However, there are following disadvantages in the rotation speed control circuit and the control system for the heat dissipation fan of the U.S. Pat. No. 8,157,536. There are many pins required and it is likely to result in a fluctuating rotation speed caused by a variation of the external passive elements. Furthermore, it is less easy for the user to adjust the rotation speed curve flexibly since the method disclosed in the U.S. Pat. No. 8,157,536 is to construct circuits and systems by way of analogy.

SUMMARY OF THE DISCLOSURE

The instant disclosure provides a rotation speed control circuit, and the rotation speed control circuit includes a temperature-controlled voltage duty generator, a pulse-width signal duty generator, a multiplier, and a rotation speed signal generator. The temperature-controlled voltage duty generator converts a temperature-controlled voltage to a digital temperature-controlled voltage and executes a linear interpolation operation according to a first setting data so as to output a temperature-controlled voltage duty signal. The pulse-width signal duty generator coverts a pulse-width input signal received to a digital pulse-width input signal and executes the linear interpolation operation according to a second setting data so as to output the pulse-width duty signal. The multiplier is connected to the temperature-controlled voltage duty generator and the pulse-width signal duty generator, the multiplier executes multiplication on the temperature-controlled voltage duty signal and the pulse-width duty signal received so as to output a mixing-duty signal. The rotation speed generator is connected to the multiplier, and receives the mixing-duty signal and a third setting data, and executes a minimum output duty operation so as to output a pulse-width output signal.

In an embodiment of the instant disclosure, the first setting data includes a first temperature-controlled voltage value, a first temperature-controlled voltage duty value, a second temperature-controlled voltage value, and a second temperature-controlled voltage duty value, wherein the first temperature-controlled voltage value and the first temperature-controlled voltage duty value correspond to a first setting temperature, and the second temperature-controlled voltage value and the second temperature-controlled voltage duty value correspond to a second setting temperature.

In an embodiment of the instant disclosure, wherein when an environment temperature is higher than the first setting temperature, a third temperature-controlled voltage value and a third temperature-controlled voltage duty value correspond to the first setting temperature, and when the environment temperature is lower than the second setting temperature, a fourth temperature-controlled voltage value and a fourth temperature-controlled voltage duty value correspond to the second setting temperature.

In an embodiment of the instant disclosure, the second setting data is a lower-bound pulse-width input duty value, and the third setting data is a lower-bound pulse-width output duty value.

In an embodiment of the instant disclosure, the lower-bound pulse-width input duty value is a duty ratio corresponding to the pulse-width input signal.

In an embodiment of the instant disclosure, the lower-bound pulse-width output duty value is a duty ratio corresponding to the pulse-width output signal.

In an embodiment of the instant disclosure, a temperature-controlled voltage duty generator includes an analog-to-digital converter, a first register, and a first linear interpolation circuit. The analog-to-digital converter converts a temperature-controlled voltage received into a digital temperature-controlled voltage. The first register receives and stores a first setting data. The first linear interpolation circuit is connected to the analog-to-digital converter and the first register, and the first linear interpolation circuit receives the digital temperature-controlled voltage and retrieves the first setting data inside the first register, and executes a linear interpolation operation on the temperature-controlled voltage according to the first setting data so as to output a temperature-controlled voltage duty signal.

In an embodiment of the instant disclosure, a pulse-width signal duty generator includes a duty counter, a second linear interpolation circuit, and a second register. The duty counter receives a pulse-width input signal and a first clock signal, and accordingly converts the pulse-width input signal into a digital pulse-width input signal. The second register receives and stores a second setting data. The second linear interpolation circuit is connected to the duty counter and the second resister, and the second linear interpolation circuit receives the digital pulse-width input signal and retrieves the second setting data in the second register, and executes a linear interpolation operation on the digital pulse-width input signal according to the second setting data so as to output a pulse-width duty signal.

In an embodiment of the instant disclosure, a rotation speed signal generator includes an adder, a third register, and a duty-to-analog converter. The third register receives and stores the third setting data. The adder is connected to the multiplier and the third register, the adder executes an addition operation on a mixing-duty signal received and the third setting data in the third register retrieved to set a minimum output duty ratio, and accordingly outputs a digital pulse-width output signal. The duty-to-analog converter is connected to the adder, and the duty-to-analog converter receives the digital pulse-width output signal and the second clock signal, and accordingly converts the digital pulse-width output signal into the pulse-width output signal.

An embodiment of the instant disclosure further provides a heat dissipation system, and the heat dissipation system includes a rotation speed control circuit, a motor, and a load, and the motor receives the pulse-width output signal and accordingly adjusts a work of adjusting rotation speed.

An embodiment of the instant disclosure further provides a rotation speed control method, and the rotation speed control method includes steps as follows: receiving a temperature-controlled voltage and a pulse-width input signal; converting the temperature-controlled voltage into a digital temperature-controlled voltage and converting the pulse-width input signal into a digital pulse-width input signal; executing a linear interpolation operation on the digital temperature-controlled voltage according to a first setting data so as to output a temperature-controlled voltage duty signal; executing the linear interpolation operation on the digital pulse-width input signal according to a second setting data so as to output a pulse-width duty signal; executing a multiplication on the temperature-controlled voltage duty signal and the pulse-width duty signal to output a mixing-duty signal; receiving the mixing-duty signal and a third setting data and accordingly executing an operation of minimum output duty ratio; outputting the pulse-width output signal. Among the above, the rotation speed control method is for the rotation speed control circuit or the heat dissipation system.

To sum up, the heat dissipation system, the rotation speed control circuit and the method thereof are able to conduct a rotation speed control with less pins than the technology in the prior art, and it is less likely for the instant disclosure to result in a fluctuating rotation speed caused by a variation of the external passive elements. Moreover, the instant disclosure controls the rotation speed in a way of digitalization, and thus the user is able to adjust the rotational curve flexibly.

For further understanding of the instant disclosure, reference is made to the following detailed description illustrating the embodiments and examples of the instant disclosure. The description is only for illustrating the instant disclosure, not for limiting the scope of the claim.

BRIEF DESCRIPTION OF THE DRAWINGS

The description recited below refers to accompanying drawings for a specific instruction of embodiments of the instant disclosure, and thereby the instant disclosure is further understood, and in the accompanying drawings.

DETAILED DESCRIPTION OF PREFERRED EMBODIMENTS

Figure 1:
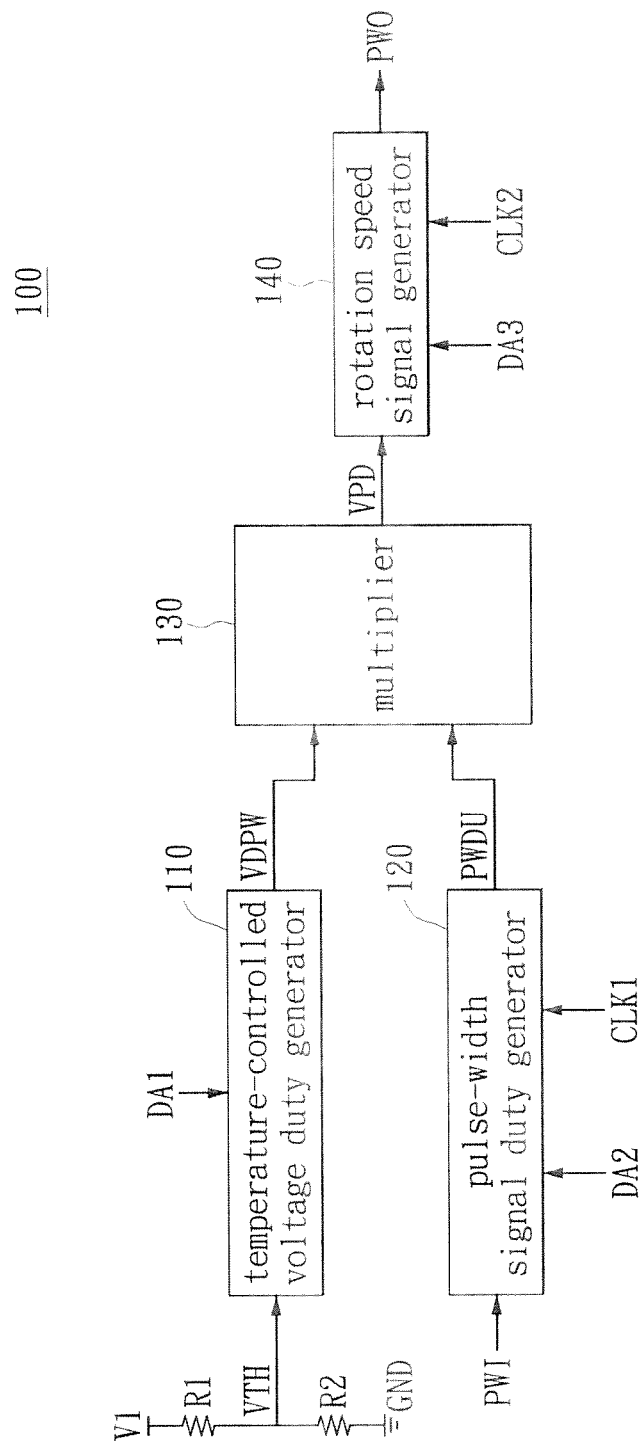
FIG. 1 shows a schematic block diagram of a rotation speed control circuit according to an embodiment of the instant disclosure.

The aforementioned illustrations and following detailed descriptions are exemplary for the purpose of further explaining the scope of the instant disclosure. Other objectives and advantages related to the instant disclosure will be illustrated in the subsequent descriptions and appended drawings. In the drawings, the size and relative sizes of layers and regions may be exaggerated for clarity.

It will be understood that, although the terms first, second, third, and the like, may be used herein to describe various elements, components, regions, layers and/or sections, these elements, components, regions, layers and/or sections should not be limited by these terms. These terms are only to distinguish one element, component, region, layer or section from another region, layer or section discussed below could be termed a second element, component, region, layer or section without departing from the teachings of the instant disclosure. As used herein, the term "and/or" includes any and all combinations of one or more of the associated listed items.

[Embodiment of a Rotation Speed Control Circuit]

Referring to FIG. 1, FIG. 1 shows a schematic block diagram of a rotation speed control circuit according to an embodiment of the instant disclosure. The rotation speed control circuit 100 includes a temperature-controlled voltage duty generator 110, a pulse-width signal duty generator 120, a multiplier 130, and a rotation speed signal generator 140.

The multiplier 130 is connected to the temperature-controlled voltage duty generator 110 and the pulse-width signal duty generator 120. In addition, a temperature-controlled voltage VTH is generated by an environment temperature detecting unit, wherein the environment temperature detecting unit includes a resistor R1 and a resistor R2, wherein the resistor R2 is a thermistor and has a resistor value inversely proportional to the temperature. A terminal of the resistor R1 is connected to a first voltage V1, and a terminal of the resistor R2 is connected to another terminal of the resistor R1, and another terminal of the resistor R2 is connected to a second voltage V2. In the present embodiment, the second voltage is a ground voltage GND, and the temperature-controlled voltage VTH is a partial voltage of the first voltage, and a partial voltage ratio is a value of the resistor R2 divided by a sum of the resistor R1 and the resistor R2. The rotation speed signal generator 140 is connected to the multiplier 130. In the present embodiment, the rotation speed control circuit 100 receives two sets of signal sources, which are the temperature-controlled voltage VTH and a pulse-width input signal PWI, and the rotation speed control circuit 100 adjusts a pulse-width output signal PWO outputted according to a change of the temperature-controlled voltage VTH and the pulse-width input signal PWI.

Regarding the temperature-controlled voltage duty generator 110, the temperature-controlled voltage duty generator 110 is for converting the temperature-controlled voltage VTH received into a digital temperature-controlled voltage, and the temperature-controlled voltage duty generator 110 executes a linear interpolation operation according to a first setting data DA1 received, and outputs a temperature-controlled voltage duty signal VDPW, wherein the temperature-controlled voltage VTH varies with the temperature change. The first setting data DA1 includes a first temperature-controlled voltage value, a first temperature-controlled voltage duty value, a second temperature-controlled voltage value, and a second temperature-controlled voltage duty value, wherein the first temperature-controlled voltage value and the first temperature-controlled voltage duty value correspond to a first setting temperature, and the second temperature-controlled voltage value and the second temperature-controlled voltage duty value correspond to a second setting temperature. In the present embodiment, the first setting temperature is higher than the second setting temperature. In addition, when the environment temperature is higher than the first setting temperature, a third temperature-controlled voltage value and a third temperature-controlled voltage duty value correspond to a predetermined value (i.e. the first temperature-controlled voltage value and the first temperature-controlled voltage duty value) of the first setting temperature, and when the environment temperature is lower than the second setting temperature, a fourth temperature-controlled voltage value and a fourth temperature-controlled voltage duty value correspond to a predetermined value (i.e. the second temperature-controlled voltage value and the second temperature-controlled voltage duty value) of the second setting temperature.

Regarding the pulse-width signal duty generator 120, the pulse-width signal duty generator 120 is for converting the pulse-width input signal PWI received into the digital pulse-width input signal in a digital form, and the pulse-width signal duty generator 120 executes a linear interpolation operation according to the second setting data DA2 received, and outputs a pulse-width duty signal PWDU in a digital form thereby. The pulse-width input signal PWI is an outside pulse-width modulation signal; in an embodiment, a central processor transmits the pulse-width input signal PWI to the rotation speed control circuit 100 according to an operation clock. The second setting data DA2 is a lower-bound pulse-width input duty value, and the lower-bound pulse-width input duty value is a duty ratio corresponding to the pulse-width input signal PWI.

Regarding the multiplier 130, the multiplier 130 is for executing a digital multiplication on a temperature-controlled voltage duty signal VDPW and the pulse-width duty signal PWDU received to output a mixing-duty signal VPD.

Regarding the rotation speed signal generator 140, the rotation speed signal generator 140 receives the mixing-duty signal VPD and a third setting data DA3, and the rotation speed signal generator 140 executes an operation of minimum output duty ratio according to the mixing-duty signal VPD and the third setting data DA3 to output the pulse-width output signal PWO, wherein the third setting data DA3 is a lower-bound pulse-width output duty value, and the lower-bound pulse-width output duty value is a duty ratio corresponding to the pulse-width output signal PWO. The operation of minimum output duty ratio indicates to ensure a working duration of the pulse-width output signal PWO to be at least longer than a minimum working duration, and further to ensure the rotation speed control circuit 100 to provide a minimum rotation speed.

In the following description is further instruction in teaching a work mechanism of the rotation speed control circuit 100.

In the modern society of information technology, a computer system has become one of indispensable information tools, and whether for a desktop personal computer (PC), a laptop PC, or server, a clock operation of a central processor is increasing, which results in an increasing heat dissipation, and a demand for heat dissipation appears to be more and more important. The rotation speed control circuit provided by the instant disclosure is a work mechanism which utilizes two sets of signal sources to control a rotation speed.

First, it is clarified that, a designer or a user is able to base on an actual demand to through an inter-integrated circuit (I2C) input the first setting data DA1, the second setting data DA2, an the third setting data DA3 respectively into the temperature-controlled voltage duty generator 110 the pulse-width signal duty generator 120, and the rotation speed signal generator 140. In an embodiment, when the environment temperature varies between the first setting temperature and the second setting temperature, the resistor value of the resistor R2 decreases with the increasing temperature, and thus the temperature-controlled voltage VTH also decreases with the increasing temperature. When the environment temperature detecting unit detects an environment temperature, the environment temperature detecting unit transmits the temperature-controlled voltage VTH to the temperature-controlled voltage duty generator 110. Afterwards, the temperature-controlled voltage duty generator 110 first digitalizes the temperature-controlled voltage VTH; which means that the temperature-controlled voltage duty generator 110 converts the temperature-controlled voltage VTH into the digital temperature-controlled voltage in a digital form. Next, according to the first temperature-controlled voltage value, the first temperature-controlled voltage duty value, the second temperature-controlled voltage value, and the second temperature-controlled voltage duty value of the first setting data DA1, the temperature-controlled voltage duty generator 110 executes a linear interpolation operation on the digital temperature-controlled voltage corresponding to the environment temperature, an outputs the temperature-controlled voltage duty signal VDPW thereby. In another embodiment, when the environment temperature is higher than the first setting temperature, the third temperature-controlled voltage value and the third temperature-controlled voltage duty value will automatically correspond to the predetermined value set by the first setting temperature; which means that the third temperature-controlled voltage value and the third temperature-controlled voltage duty value will respectively correspond to the first temperature-controlled voltage value and the first temperature-controlled voltage duty value. When the environment temperature is lower than the second setting temperature, the fourth temperature-controlled voltage value and the fourth temperature-controlled voltage duty value will automatically correspond to the predetermine value set by the second setting temperature; which means that the fourth temperature-controlled voltage value and the fourth temperature-controlled voltage duty value will respectively correspond to the second temperature-controlled voltage value and the second temperature-controlled voltage duty value. It is worth mentioning that the designer or the user is able to base on a designing demand or an actual application demand to further set the values of the first setting temperature and the second setting temperature.

In addition, the rotation speed control circuit 100 of the instant disclosure is through the control or two sets of signal sources to adjust the pulse-width output signal PWO outputted and further to actively adjust the rotation speed of the fan; therefore, during an operation of the temperature-controlled voltage duty generator 110, the pulse-width signal duty generator 120 operates as well, and thus the rotation speed control circuit 100 is able to generate the pulse-width output signal PWO which fits a current rotation speed the best. First, the pulse-width signal duty generator 100 utilizes a first clock signal CLK1 received to proceed a counting on the pulse-width input signal PWI and further converts the pulse-width input signal PWI into the digital pulse-width input signal in the digital form. Next, the pulse-width signal duty generator 100 executes a linear interpolation operation on the digital pulse-width input signal according to the second setting data DA2 received, and outputs the pulse-width duty signal PWDU thereby. Among which, the second setting data DA2 is the lower-bound pulse-width input duty value, and the lower-bound pulse-width input duty value correspond to a working duration or a duty ratio of the pulse-width input signal PWI, and accordingly the minimum working duration of the pulse-width input signal PWI is ensured. In an embodiment, the lower-bound pulse-width input duty value is 20%, and this is for a specification demand of the current central processor; which means under any environment temperature, the pulse-width input signal PWI of the central processor is able to produce a fixed rotation speed when the working duration is under 20%, and the instant disclosure is not limited thereto. The specification here is to ensure a basic air flow of the fan, and to achieve an effect of energy-saving.

Following up, the multiplier 130 executes the multiplication on the temperature-controlled voltage duty signal VDPW and the pulse-width duty signal PWDU, which means that the multiplier 130 executes the multiplication on the two digital signals. Afterwards, the multiplier 130 outputs a mixing-duty signal VPD to the rotation speed signal generator 140, to further produce the pulse-width output signal.

The rotation speed signal generator 140 first executes operation of minimum output duty ratio on the mixing-duty signal VPD according to the third setting data DA3 received; which is to execute a shift operation on the mixing-duty signal VPD to ensure the minimum working duration of the pulse-width output signal, wherein the third setting data DA3 is the lower-bound pulse-width output duty value, and the lower-bound pulse-width output duty value corresponds to the duty ratio of the pulse-width output signal. In an embodiment, the lower-bound pulse-width output duty value is 29.4%, and the instant disclosure is not limited thereto. Furthermore, in the present embodiment, when the duty ratio of the pulse-width input signal PWI that the rotation speed control circuit 100 receives is the minimum working duration (i.e. the lower-bound pulse-width input duty value), the duty ratio of the pulse-width output signal PWO outputted by the rotation speed control circuit 100 is the lower-bound pulse-width output duty value, and accordingly the minimum rotation speed and the basic air flow of the fan are ensured. Afterwards, through a second clock signal CLK2 received, the rotation speed signal generator 140 proceed a counting on the mixing-duty signal VPD which is after a shift, and outputs the pulse-width output signal PWO to a next circuit block (not shown in FIG. 1) to actively provide an appropriate rotation speed according to the environment.

Accordingly, the rotation speed control circuit 100 of the instant disclosure is not only able to solve the issue that the rotation speed fluctuates when the duty ratio (working duration) of the pulse-width input signal is smaller than the lower-bound pulse-width input duty value in the prior art, but also able to improve the heat dissipation and to be in accordance with the demand of energy-saving and noise-reduction. Furthermore, the instant disclosure is able to achieve generating the fixed rotation speed when the duty ratio (working duration) of the pulse-width input signal is smaller than the lower-bound pulse-width input duty under any environment temperature, and the basic air flow of the fan is ensured. In addition, the instant disclosure embodiments that the rotation speed control circuit is able to reduce a fluctuating rotation speed caused by a variation of the external passive elements in a way of digitalization.

For a specific instruction on an operation process of the rotation speed control circuit 100 of the instant disclosure, there is at least one of the embodiments for further instruction.

In the following embodiments, there are only parts different from embodiments in FIG. 1 described, and the omitted parts are indicated to be identical to the embodiments in FIG. 1. In addition, for an easy instruction, similar reference numbers or symbols refer to elements alike.

[Embodiment of a Rotation Speed Control Circuit]

Figure 2:
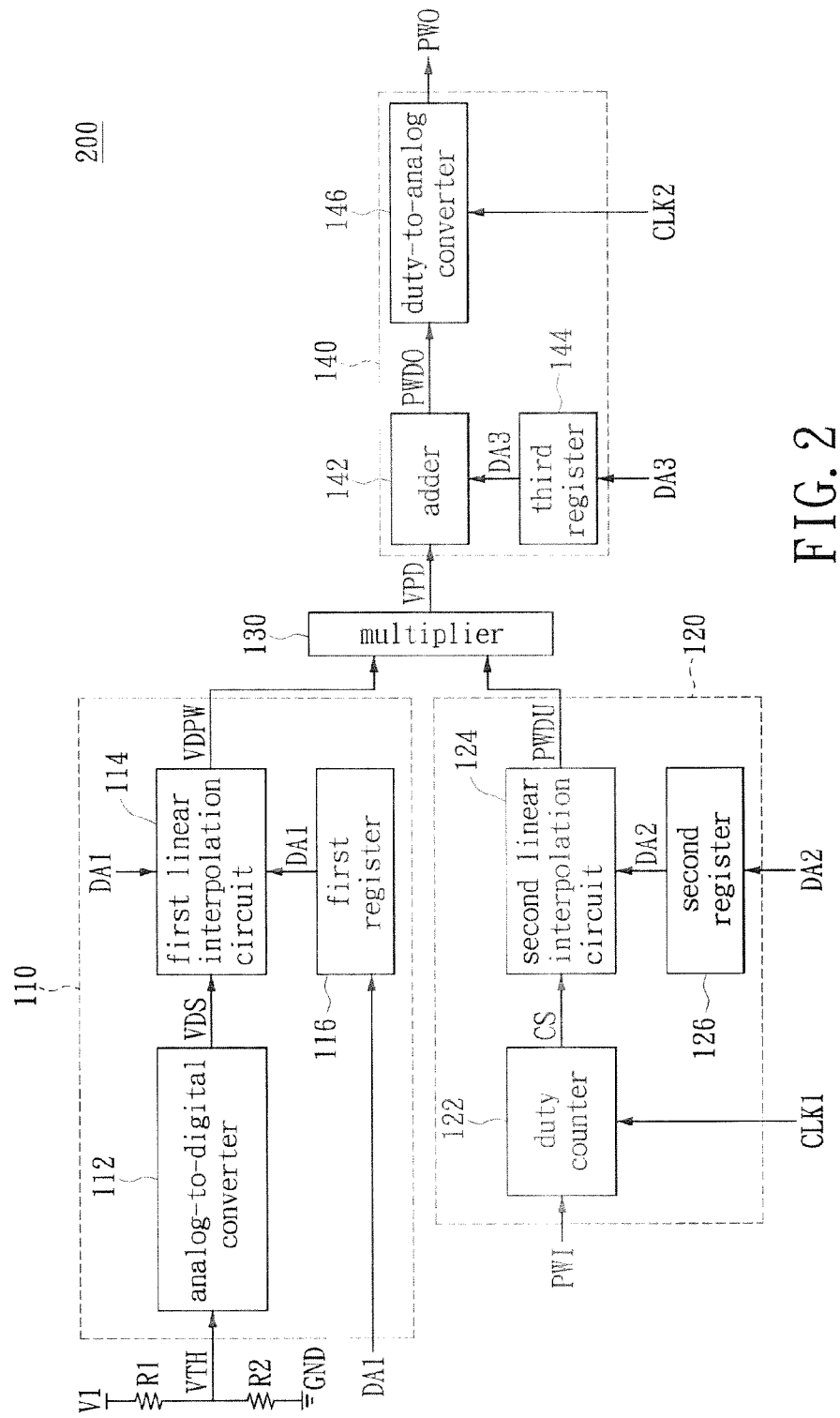
FIG. 2 shows a schematic block diagram of a rotation speed control circuit according to an embodiment of the instant disclosure.

Referring to FIG. 2, FIG. 2 shows a schematic block diagram of a rotation speed control circuit according to an embodiment of the instant disclosure. Different from the embodiment in FIG. 1, in the present embodiment, a temperature-controlled voltage duty generator 110 includes an analog-to-digital converter 112, a first linear interpolation circuit 114, and a first register 116. A pulse-width signal duty generator 120 includes a duty counter 122, a second linear interpolation circuit 124, and a second register 126. A rotation speed signal generator 140 includes an adder 142, a third register 144, and a duty-to-analog converter 146.

The analog-to-digital converter 112 is connected to the first linear interpolation circuit 114, and the first linear interpolation circuit 114 is connected between the analog-to-digital converter 112 and the multiplier 130. The first register 116 is connected to the first linear interpolation circuit 114. The duty counter 122 is connected to the second linear interpolation circuit 124, and the second linear interpolation circuit 124 is connected between the duty counter 122 and the multiplier 130. The second register 126 is connected to the second linear interpolation circuit 124. The adder 142 is connected to the multiplier 130, and the duty-to-analog converter 146 is connected to the adder 142, and the third register 144 is connected to the adder 142.

Regarding the analog-to-digital converter 112 in the temperature-controlled voltage duty generator 110, the analog-to-digital converter 112 is for converting a temperature-controlled voltage VTH received into a digital temperature-controlled voltage VDS in the digital form. In the present embodiment, the analog-to-digital converter 112 converts an analog signal into a digital signal with a resolution of 8 bits, and it is not limited thereto, a number of bit does not affect the scope of the claim of the instant disclosure. Regarding the first register 116, the first register 116 is for receiving a first setting data DA1, and stores the first setting data DA1. According to an actual application demand, a user or a designer is able to respectively write a first temperature-controlled voltage value of the first setting data DA1, a first temperature-controlled voltage duty value, a second temperature-controlled voltage value, and a second temperature-controlled voltage duty value into the first register 116 through an inter-integrated circuit (I2C). Regarding the first linear interpolation circuit 114, the first linear interpolation circuit 114 is for receiving the digital temperature-controlled voltage VDS and retrieving the first setting data DA1 in the first register 116, and the first linear interpolation circuit 114 executes a linear interpolation operation on the digital temperature-controlled voltage VTH according to the first setting data DA1, and a temperature-controlled voltage duty signal VDPW is outputted thereby.

Regarding the duty counter 122 of the pulse-width signal duty generator 120, the duty counter 122 is for receiving a pulse-width input signal PWI and a first clock signal CLK1, and the duty counter 122 executes a counting on the pulse-width input signal PWI through the first clock signal CLK1 to convert the pulse-width input signal PWI into a digital pulse-width input signal CS. In the present embodiment, the duty counter 122 executes the counting on the pulse-width input signal PWI with the resolution of eight bits, to convert a working duration of the pulse-width input signal PWI into the bit value corresponded, which is the digital pulse-width input signal CS corresponded. Regarding the second register 126, the second register 126 is for receiving a second setting data DA2 and stores the second setting data DA2. According to an actual application demand, a user or a designer is able to write the lower-bound pulse-width input duty value of the second setting data DA2 into the second register 126 through the I2C interface, wherein the lower-bound pulse-width input duty value corresponds to the duty ratio (i.e. the working duration) of the pulse-width input signal PWI. In an embodiment, the duty ratio of the pulse-width input signal PWI corresponding to the lower-bound pulse-width input duty value is 20%, and it is not limited in the instant disclosure. Regarding the second linear interpolation circuit 124, the second linear interpolation circuit 124 is for receiving the digital pulse-width input signal CS and retrieving second setting data DA2 in the second register 126, and the second linear interpolation circuit 124 executes the linear interpolation operation on the digital pulse-width input signal CS according to the second setting data DA2, and a pulse-width duty signal PWDU is outputted thereby.

Regarding the third register 144 in the rotation speed signal generator 140, the third register 144 is for receiving a third setting data DA3 and stores the third setting data DA3. According to the actual application demand, a user or a designer is able to write a lower-bound pulse-width output duty value of the third setting data DA3 into the third register 126 through the I2C, wherein an upper-bound pulse-width output duty value corresponds to the duty ratio (i.e. the working duration) of a pulse-width output signal PWO. In an embodiment, the duty ratio of the pulse-width output signal PWO corresponding to the ver-bound pulse-width output duty value is 29.4%, and the instant disclosure is not limited thereto. Regarding the adder 142, the adder 142 is for an addition operation on a mixing-duty signal VPD received and the third setting data DA3 inside the third register 144 retrieved to set a minimum output duty ratio, and accordingly the adder 142 outputs a digital pulse-width output signal PWDO. Regarding the duty-to-analog converter 146, the duty-to-analog converter 146 is for receiving the digital pulse-width output signal PWDO and the second clock signal CLK2, and the duty-to-analog converter 146 proceeds an counting on the second clock signal CLK2 to proceed the counting to convert the digital pulse-width output signal PWDO into the impulse switch signal.

In the following description is further instruction in teaching a work mechanism of the rotation speed control circuit 200.

For an easy instruction and understanding of the instant disclosure, a first setting temperature is set as 38 degrees Celsius and a second setting temperature is set as 30 degrees Celsius for an example, and it is not limited thereto, a user may set the first setting temperature and the second setting temperature according to the actual application demand. Furthermore, the first linear interpolation circuit 114 inside the rotation speed control circuit 200 determines an upper bound and lower bound according to a setting of the first setting data DA1; which means that the upper bound of the temperature is the first setting temperature, and the lower bound of the temperature is the second setting temperature. It is noticed that, when the environment temperature is higher than the first setting temperature, the first linear interpolation circuit 114 of the rotation speed control circuit 200 takes the environment temperature as the first setting temperature to proceed a follow-up signal processing. In addition, when the environment temperature is lower than the second setting temperature, the first linear interpolation circuit 114 of the rotation speed control circuit 200 takes the environment temperature at the moment as the second setting temperature to proceed a follow-up signal processing.

When an environment temperature detecting unit detects the environment temperature, like 35 degrees Celsius, is between the first setting temperature (38 degrees Celsius) and the second setting temperature (30 degrees Celsius), a resistor value of a resistor R2 correspondingly changes to allow the environment temperature detecting unit to generate the temperature-controlled voltage VTH and transmits to the analog-to-digital converter 112, wherein the resistor R2 is a thermistor. Next, in the present embodiment, the analog-to-digital converter 112 converts the temperature-controlled voltage VTH of an analog signal into a digital signal with a resolution of 8 bits, and afterwards, the analog-to-digital converter outputs a digital temperature-controlled voltage VDS corresponding to 35 degrees Celsius to the first linear interpolation circuit 114.

Figure 3:
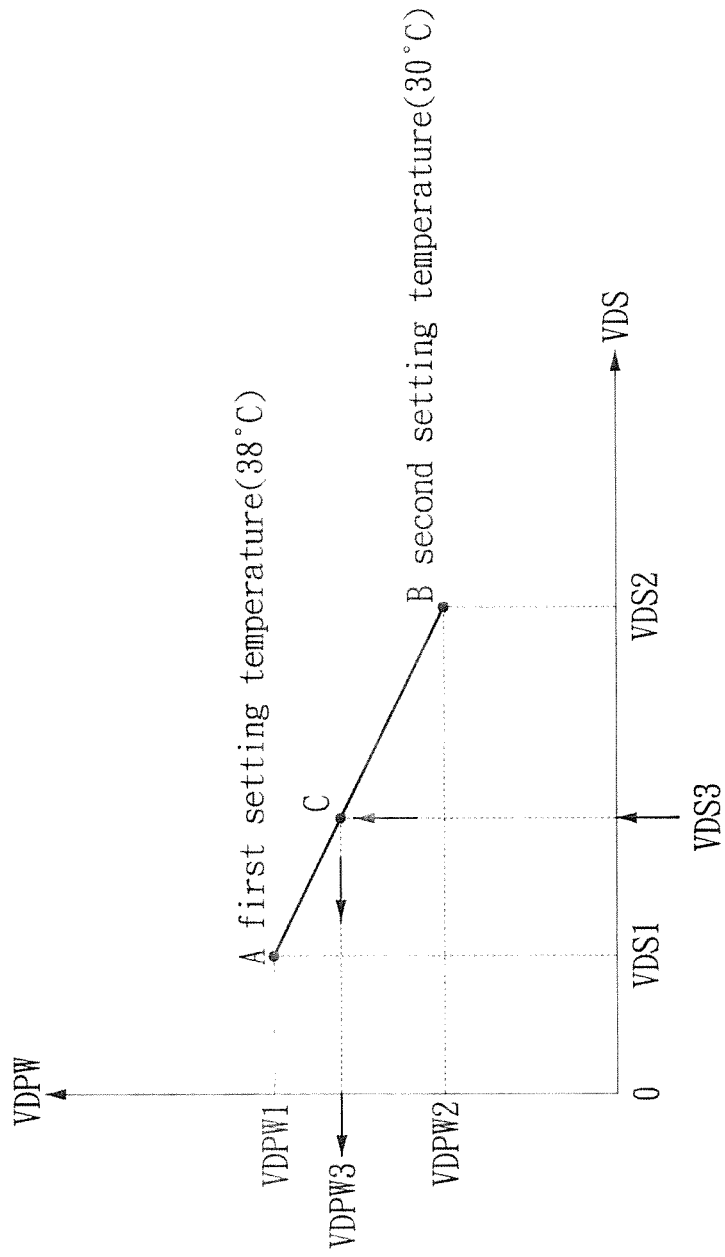
FIG. 3 shows a schematic coordinate diagram of a first linear interpolation circuit executing an interpolation operation according to an embodiment of the instant disclosure.

Next, the first linear interpolation circuit 114 executes a linear interpolation operation on the digital temperature-controlled voltage received. Regarding this, please refer to FIG. 3 as well, FIG. 3 shows a schematic coordinate diagram of a first linear interpolation circuit executing an interpolation operation according to an embodiment of the instant disclosure. In FIG. 3, symbol A represents a coordinate A(VDS1, VDPW1) formed by a first temperature-controlled voltage value VDS1 and a first temperature-controlled duty value VDPW1, and symbol B represents a coordinate B (VDS2, VDPW2) formed by a second temperature-controlled voltage value VDS2 and a second temperature-controlled duty value VDPW2, wherein the first temperature-controlled voltage value VDS1, the first temperature-controlled duty value VDPW1, the second temperature-controlled voltage value VDS2, and the second temperature-controlled duty value VDPW2 are the first setting data; which means that a content of the first register 116 includes coordinates A(VDS1, VDPW1) and B (VDS2, VDPW2). As shown in FIG. 3, the first linear interpolation circuit 114 executes the linear interpolation operation on a digital temperature-controlled voltage VDS3 which is corresponding to 35 degrees Celsius according to equation (1) to obtain a value of a temperature-voltage duty signal VDPW3. Afterwards, the first linear interpolation circuit 114 outputs the temperature-voltage duty signal VDPW3 corresponding to 35 degrees Celsius to the multiplier 130.

$$\frac{VDS2 - VDS3}{VDS2 - VDS1} = \frac{VDPW3 - VDPW2}{VDPW1 - VDPW2} \quad (1)$$

Moreover, the rotation speed control circuit 200 provided by the instant disclosure adjusts the pulse-width output signal PWO and further actively adjusts the rational speed of the fan with two sets of signal sources to control. Therefore, during an operation of the temperature-controlled voltage duty generator 110, the pulse-width signal duty generator 120 operates as well, and thus the rotation speed control circuit 200 is able to generate the pulse-width output signal PWO which fits a current rotation speed the best. First of all, the duty counter 122 proceeds a counting on pulse-width input signal PWI through the first clock signal CLK1. For specific instruction of relevant details of the duty counter 122 proceeding the counting, there is further instruction along with another drawing.

Figure 4:
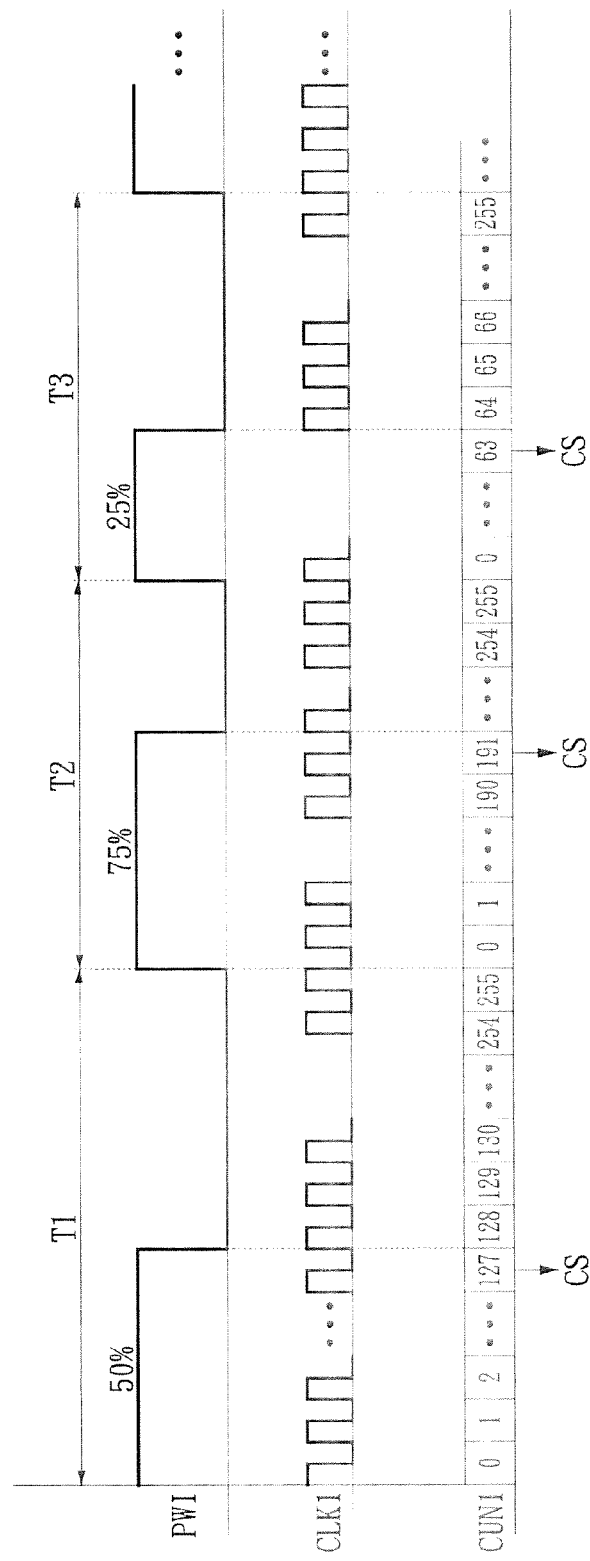
FIG. 4 shows a schematic diagram of a duty counter conducting a counting according to an embodiment of the instant disclosure.

Referring to FIG. 4, FIG. 4 shows a schematic diagram of a duty counter proceeding a counting according to an embodiment of the instant disclosure. For an easy instruction and understanding of the instant disclosure, in the present embodiment, the duty counter 122 is a counter of 8 bits; however, a user may use a duty counter 122 of more than 8 bits for a higher resolution. Therefore, the duty counter 122 counts from "0" to "255" and is reset then, the counting from "0" to "255" keeps repeating. When the pulse-width input signal PWI is transformed from a high level voltage into a low level voltage, the duty counter 122 outputs a count value to the second linear interpolation circuit 124, wherein CUN1 is the count value. Furthermore, in a first duration T1, the duty counter 122 receives the pulse-width input signal PWI with a working duration of 50%, and the duty counter 122 utilizes a rising edge of the first clock signal CLK1 to proceed a counting on the pulse-width input signal PWI. When the pulse-width input signal PWI with the working duration of 50% is transformed from a high level voltage into a low level voltage, the duty counter 122 outputs the digital pulse-width input signal CS of the count value as "127" to the second linear interpolation circuit 124. In a second duration T2, the receives the pulse-width input signal PWI with a working duration of 75%, and the duty counter 122 utilizes a rising edge of the first clock signal CLK1 to proceed a counting on the pulse-width input signal PWI. When the pulse-width input signal PWI with the working duration of 75% is transformed from a high level voltage into a low level voltage, the duty counter 122 outputs the digital pulse-width input signal CS of the count value as "191" to the second linear interpolation circuit 124. In a third duration T3, the receives the pulse-width input signal PWI with a working duration of 25%, and the duty counter 122 utilizes a rising edge of the first clock signal CLK1 to proceed a counting on the pulse-width input signal PWI. When the pulse-width input signal PWI with the working duration of 25% is transformed from a high level voltage into a low level voltage, the duty counter 122 outputs the digital pulse-width input signal CS of the count value as "63" to the second linear interpolation circuit 124.

For further understanding of the instant disclosure, the digital pulse-width input signal CS outputted in the first duration T1 recited in the following description is for further instruction.

Figure 5:
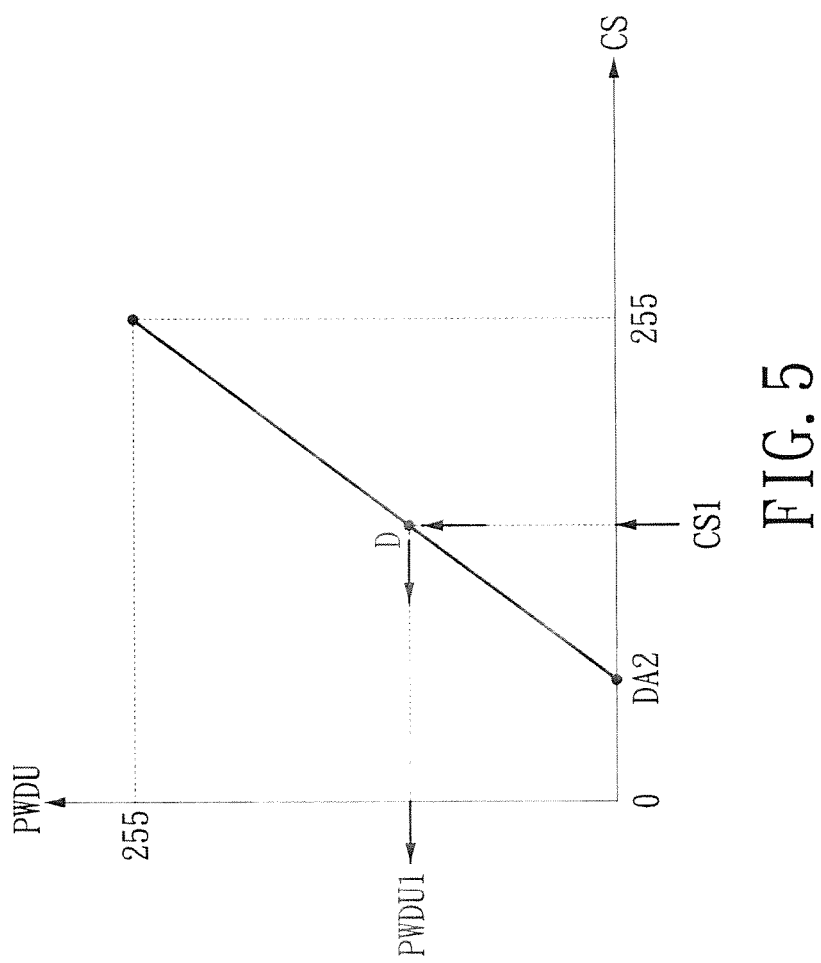
FIG. 5 shows a schematic coordinate diagram of a second linear interpolation circuit executing a interpolation operation according to an embodiment of the instant disclosure.
Figure 6:
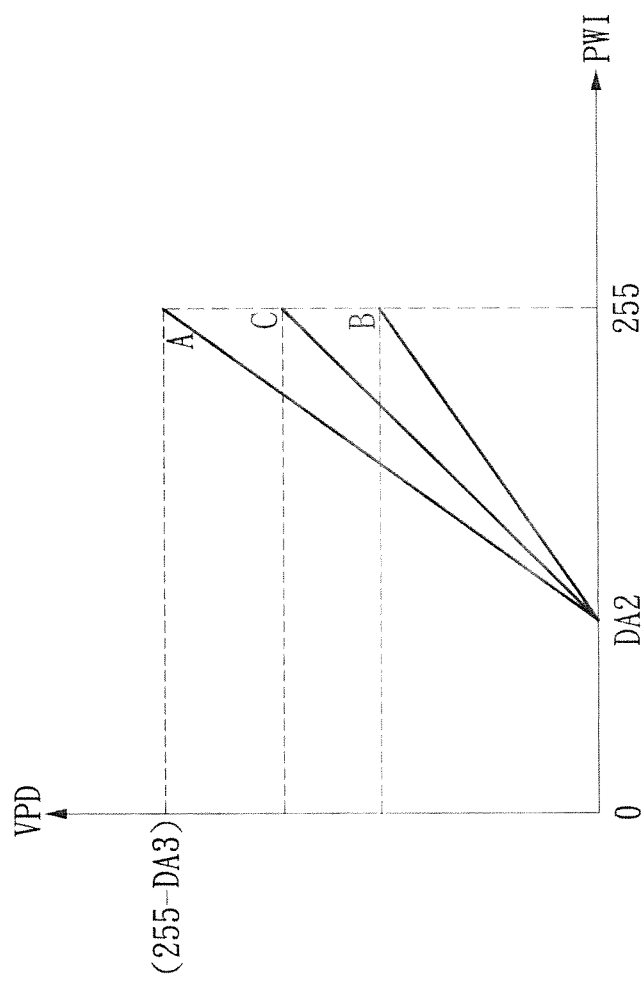
FIG. 6 shows a schematic coordinate diagram of a multiplier according to an embodiment of the instant disclosure.

Next, the second linear interpolation circuit 124 executes a linear interpolation operation on the digital pulse-width input signal CS (count value "127" received. Regarding this, please refer to FIG. 2 with FIG. 5, FIG. 5 shows a schematic coordinate diagram of a second linear interpolation circuit 124 executing a interpolation operation according to an embodiment of the instant disclosure. The second linear interpolation circuit 124 retrieves the second setting data DA2 from the second register 126 to set a linear interpolation, wherein the second setting data DA2 is the lower-bound pulse-width input duty value. In an embodiment, to be in accordance with the current specification demand of the fan for the central processor, and which is to generate a fixed rotation speed to ensure a basic air flow of the wind in any environment temperature when the working duration of the pulse-width input signal PWI is smaller than 20%; therefore, the lower-bound pulse-width input duty value is 20%, and the count value of the digital pulse-width input signal CS corresponded is about "52", and the example of 20% as described above is not used to limit the instant disclosure.

The second linear interpolation circuit 124 executes the linear interpolation operation on the digital pulse-width input signal CS1 with a count value of "127" according to equation (2) to obtain a value of a pulse-width duty signal PWDU1.

$$\frac{CS1 - DA2}{PWDU1} = \frac{255 - DA2}{255} \quad (2)$$

Next, please refer to FIGS. 2-6, FIG. 6 shows a schematic coordinate diagram of a multiplier according to an embodiment of the instant disclosure. The multiplier 130 executes a digital multiplication on the temperature-controlled voltage duty signal VDPW received and the pulse-width duty signal PWDU to output the mixing-duty signal VPD to the adder 142. The temperature-controlled voltage duty signal VDPW is a digital signal of 8 bits and the pulse-width duty signal PDWU is also a digital signal of 8 bits; therefore, a result of the multiplication conducted by the multiplier 130 is a digital signal of 16 bits. In the present embodiment, the multiplier 130 takes 8 bits from the digital signal of 16 bits to produce the mixing-duty signal VPD to reduce an error effect, wherein the 8 bits is counted down from a highest and effective bit of the 16 bits, and it is not limited thereto. It is worth mentioning that, in FIG. 6, an effective value of the pulse-width input signal on the horizontal axis is from the second setting data DA2 to 255, and the effective value of the mixing-duty signal VPD on the vertical axis is 255 minus the third setting data DA3.

Afterwards, the adder 142 executes an addition operation on the mixing-duty signal VPD according to the third setting data DA3 retrieved from the third register 144 to set a minimum output duty ratio and output the digital pulse-width output signal PWDO to the duty-to-analog converter 146, wherein the third setting data DA3 is a lower-bound pulse-width output duty value. In an embodiment, to be in accordance with the current specification demand of the basic air flow of the fan, the lower-bound pulse-width output duty value is 29.4%. In other words, the present embodiment is able to set a minimum working duration of the pulse-width output signal PWO through the adder 142, and accordingly to produce the pulse-width output signal PWO which ensures the minimum rotation speed and maintains the basic air flow.

Figure 7:
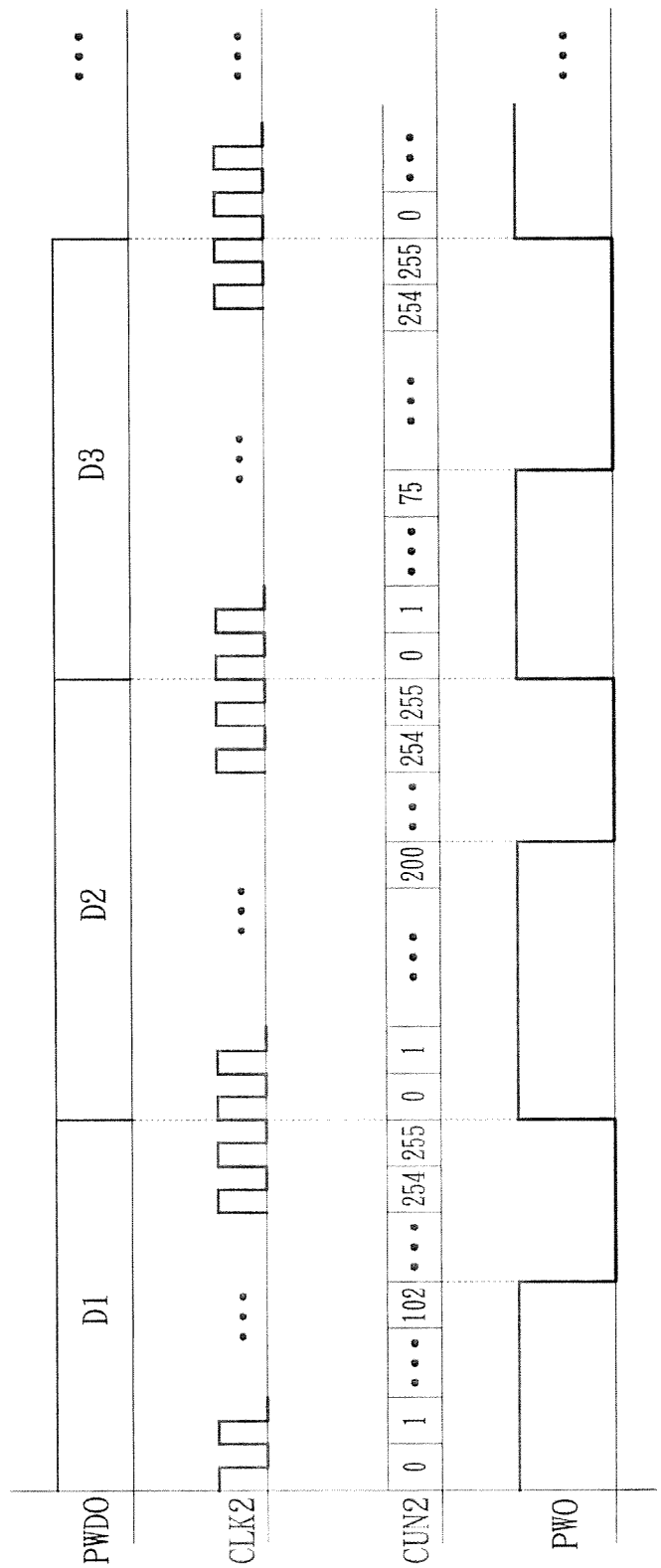
FIG. 7 shows a waveform diagram of converting a digital pulse-width signal according to an embodiment of the instant disclosure.

Through the second clock signal CLK2, the duty-to-analog converter 146 proceeds a counting on the digital pulse-width output signal PWDO to convert the digital pulse-width output signal PWDO into the pulse-width output signal PWO. Regarding this, please refer to FIG. 7 as well; FIG. 7 shows a waveform diagram of converting a digital pulse-width signal according to an embodiment of the instant disclosure. For example, when a first data value D1 of the digital pulse-width output signal PWDO is "102," the duty-to-analog converter 146 keeps counting from "0" to "255," as shown in a count value CUN2. During the duty-to-analog converter 146 counting from "0" to "102," the duty-to-analog converter 146 outputs the pulse-width output signal PWO of a high level voltage; during the duty-to-analog converter 146 counting from "103" to "255," the duty-to-analog converter 146 outputs the pulse-width output signal PWO of a low level voltage, and accordingly the digital pulse-width output signal PWDO is converted into a pulse-width output signal PWO with a working duty corresponding to the first data value D1 of "102." When a second data value D2 of the digital pulse-width output signal PWDO is "200," the duty-to-analog converter 146 keeps counting from "0" to "255" as well. In addition, during the duty-to-analog converter 146 counting from "0" to "200," the duty-to-analog converter 146 outputs the pulse-width output signal PWO of a high level voltage; during the duty-to-analog converter 146 counting from "201" to "255," the duty-to-analog converter 146 outputs the pulse-width output signal PWO of a low level voltage, and accordingly the digital pulse-width output signal PWDO is converted into a pulse-width output signal PWO with a working duty corresponding to the second data value D2 of "200."

Finally, when a third data value D3 of the digital pulse-width output signal PWDO is "75," the duty-to-analog converter 146 will keep counting from "0" to "255." During the duty-to-analog converter 146 counting from "0" to "75," the duty-to-analog converter 146 outputs the pulse-width output signal PWO of a high level voltage; during the duty-to-analog converter 146 counting from "76" to "255," the duty-to-analog converter 146 outputs the pulse-width output signal PWO of a low level voltage, and accordingly the digital pulse-width output signal PWDO is converted into a pulse-width output signal PWO with a working duty corresponding to the third data value D3 of "75."

Figure 8:
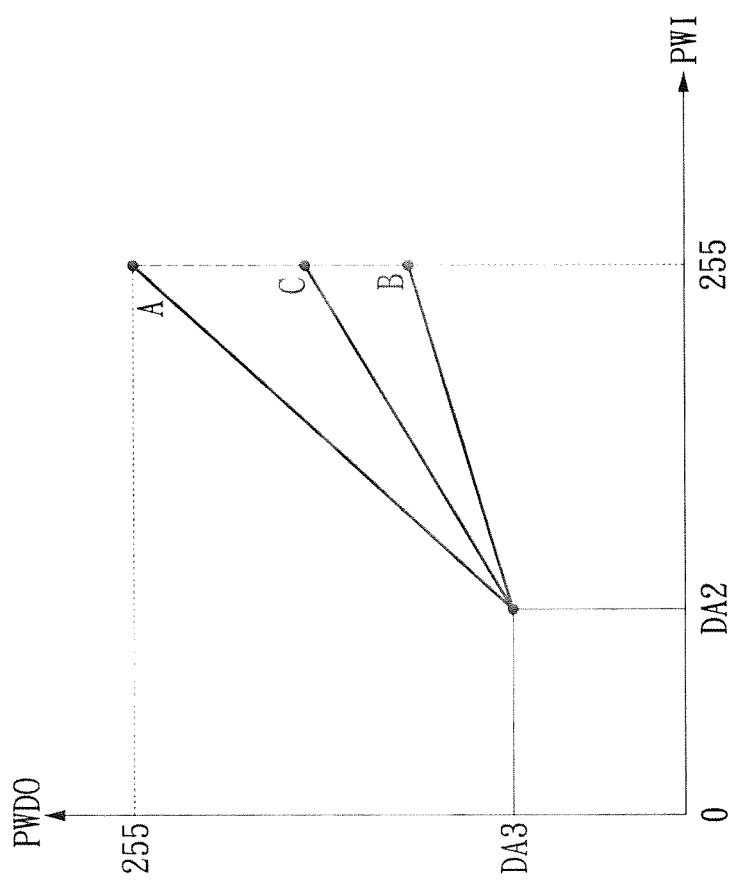
FIG. 8 shows a schematic diagram of a pulse-width input signal being converted into a digital pulse-width output signal according to an embodiment of the instant disclosure.

Accordingly, please refer to FIGS. 2-8; FIG. 8 shows a schematic diagram of a pulse-width input signal being converted into a digital pulse-width output signal according to an embodiment of the instant disclosure. As shown in FIG. 8, the rotation speed control circuit 200 is under 3 different temperatures, and when the rotation speed control circuit 200 receives the pulse-width input signal PWI transmitted by the central processor, the rotation speed control circuit 200 outputs the digital pulse-width output signal PWDO according to a corresponding temperature curve. It is worth noticing that, whether the working duration of the pulse-width input signal PWI transmitted by the central processor is, the rotation speed control circuit 200 shifts the working duration of the pulse-width input signal PWI between the second setting data and 255 (working duration of "100") through the second linear interpolation circuit 124 and the second setting data DA2 (stored in the second register 126. Furthermore, the rotation speed control circuit 200 converts the mixing-duty signal VPD into the digital pulse-width output signal PWDO and shifts the mixing-duty signal VPD between the third setting data DA3 to 255 (working duration of "100%") through the adder 142 and the third setting data DA3 (stored in the third register 144).

Accordingly, the rotation speed control circuit 200 of the instant disclosure is able to proceed a rotation speed control with less pins than the technology in prior art, and it is less likely for the instant disclosure to result in a fluctuating rotation speed caused by a variation of the external passive elements. Moreover, the instant disclosure controls the rotation speed in a way of digitalization, and thus the user is able to adjust the rotational curve flexibly. It is worth mentioning that, there are still the following advantages of the instant disclosure. When the duty ratio (working duration) of the pulse-width input signal is smaller than the lower-bound pulse-width input duty value, there is still the fixed rotation speed generated, and accordingly the effect of heat dissipation is increased and the demand of energy-saving and noise-reduction is achieved. Furthermore, the instant disclosure is able to achieve generating the fixed rotation speed when the duty ratio (working duration) of the pulse-width input signal is smaller than the lower-bound pulse-width input duty value under any environment temperature, and the basic air flow of the fan is ensured. In addition, the instant disclosure embodiments that the rotation speed control circuit is able to reduce a fluctuating rotation speed caused by a variation of the external passive elements in a way of digitalization.

For a specific instruction on an operation process of the rotation speed control circuit 200 of the instant disclosure, there is at least one of the embodiments for further instruction.

In the following embodiments, there are only parts different from embodiments in FIG. 2 described, and the omitted parts are indicated to be identical to the embodiments in FIG. 2. In addition, for an easy instruction, similar reference numbers or symbols refer to elements alike.

[Embodiment of a Rotation Speed Control Method]

Figure 9:
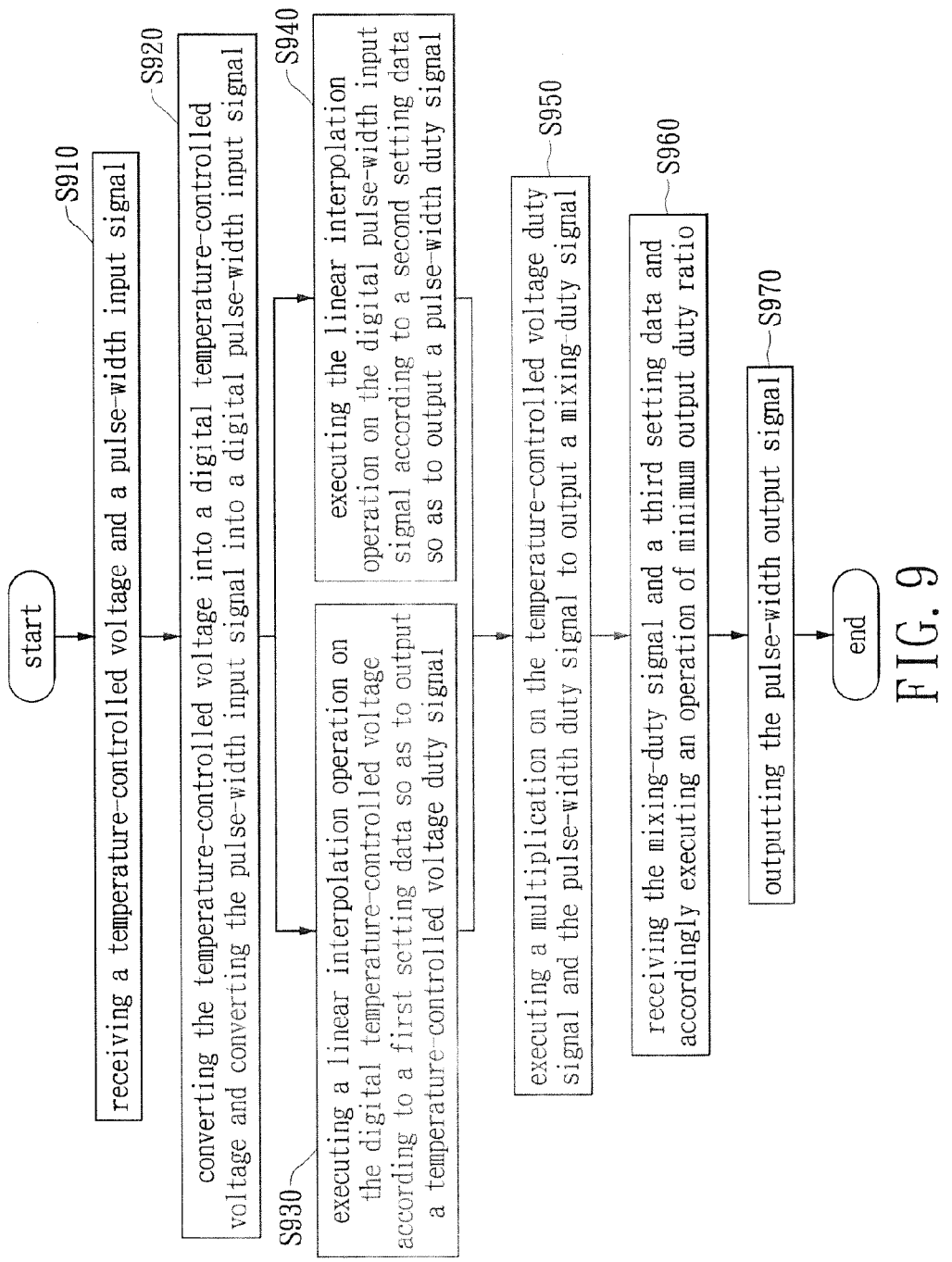
FIG. 9 shows a flow chart of a rotation speed control method according to an embodiment of the instant disclosure.

Referring to FIG. 9, FIG. 9 shows a flow chart of a rotation speed control method according to an embodiment of the instant disclosure. An explanatory sequence of steps in the present embodiment may be embodied with the rotation speed control circuit 100 as shown in FIG. 1 or the rotation speed control circuit 200 in FIG. 2, and thus please refer to FIGS. 1 and 2 for an easy understanding. The rotation speed control method includes steps as follows: receiving a temperature-controlled voltage and a pulse-width input signal (S910); converting the temperature-controlled voltage into a digital temperature-controlled voltage and converting the pulse-width input signal into a digital pulse-width input signal (S920); executing a linear interpolation operation on the digital temperature-controlled voltage according to a first setting data and accordingly outputting a temperature-controlled voltage duty signal (S930); executing the linear interpolation operation on the digital pulse-width input signal according to a second setting data and accordingly outputting a pulse-width duty signal (S9401); executing a multiplication on the temperature-controlled voltage duty signal and the pulse-width duty signal to output a mixing-duty signal (S950); receiving the mixing-duty signal and a third setting data and accordingly executing an operation of minimum output duty ratio (S960); outputting the pulse-width output signal (S970).

Relevant details of the steps of the rotation speed control method regarding the rotation speed control circuit are described in the embodiments of FIGS. 1-8, and thus it is not repeated thereto.

It is clarified that, a sequence of steps in FIG. 9 is set for a need to instruct easily, and thus the sequence of the steps is not used as a condition in demonstrating the embodiments of the instant disclosure.

[Embodiment of a Heat Dissipation System]

Figure 10:
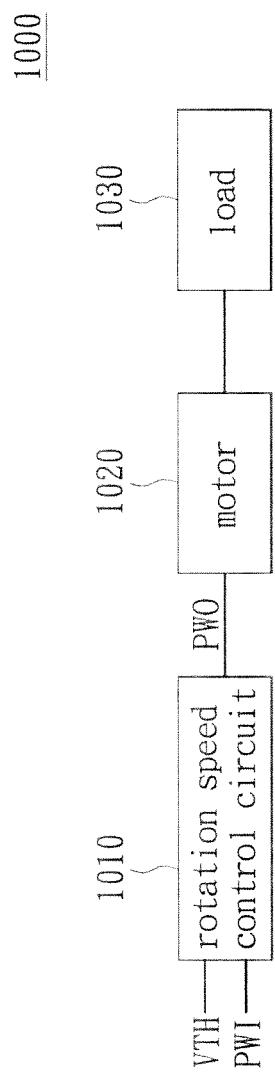
FIG. 10 shows a schematic block diagram of a heat dissipation system according to an embodiment of the instant disclosure.

Referring to FIG. 10, FIG. 10 shows a schematic block diagram of a heat dissipation system according to an embodiment of the instant disclosure. The heat dissipation system 1000 includes a rotation speed control circuit 1010, a motor 1020, and a load 1030. The motor 1020 is connected to the rotation speed control circuit 1010. The load 1030 is connected to the motor 1020, wherein the load 1030 may be a heat dissipation fan, mainly for a heat dissipation work for the system. In the present embodiment, the rotation speed control circuit 1010 may be either the rotation speed control circuit 100 or the rotation speed control circuit 200, wherein the rotation speed control circuit 1010 outputs the pulse-width output signal PWO to the motor 1020 according to two signal sources received, which are a temperature-controlled voltage VTH and a pulse-width input signal PWI, wherein the motor 1020 adjusts a work of adjusting rotation speed according to the pulse-width output signal PWO. Therefore, the heat dissipation system 1000 of the present embodiment is not only able to actively adjust the rotation speed of the load 1030 according to an environment variation, but is also able to provide a minimum rotation speed to ensure that a basic air flow of a fan is in accordance with a current specification.

To sum up, the heat dissipation system, the rotation speed control circuit and the method thereof are able to conduct a rotation speed control with less pins than the technology in the prior art, and it is less likely for the instant disclosure to result in a fluctuating rotation speed caused by a variation of the external passive elements. Moreover, the instant disclosure controls the rotation speed in a way of digitalization, and thus the user is able to adjust the rotational curve flexibly.

In at least one of the embodiments of the instant disclosure, it is possible to achieve generating the fixed rotation speed when the duty ratio (working duration) of the pulse-width input signal is smaller than the lower-bound pulse-width input duty value under any environment temperature, and the basic air flow of the fan is ensured.

In at least one of the embodiments of the instant disclosure, the instant disclosure embodiments that the rotation speed control circuit is able to reduce a fluctuating rotation speed caused by a variation of the external passive elements in a way of digitalization and simplify the circuit.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. A rotation speed control circuit, comprising:
a temperature-controlled voltage duty generator, converting a temperature-controlled voltage into a digital temperature-controlled voltage and executing a linear interpolation operation according to a first setting data so as to output a temperature-controlled voltage duty signal, wherein the temperature-controlled voltage varies with a temperature change;
a pulse-width signal duty generator, converting a pulse-width input signal received to a digital pulse-width input signal and executing the linear interpolation operation according to a second setting data so as to output a pulse-width duty signal;
a multiplier, connected to the temperature-controlled voltage duty generator and the pulse-width signal duty generator, and the multiplier executing a multiplication on the temperature-controlled voltage duty signal and the pulse-width duty signal received so as to outputs mixing-duty signal; and
a rotation speed signal generator, connected to the multiplier, and the rotation speed signal generator receiving the mixing-duty signal and a third setting data, and accordingly executes a minimum output duty operation so as to outputs a pulse-width output signal.

2. The rotation speed control circuit according to claim 1, wherein the first setting data includes a first temperature-controlled voltage value, a first temperature-controlled voltage duty value, a second temperature-controlled voltage value and a second temperature-controlled voltage duty value, wherein the first temperature-controlled voltage value and the first temperature-controlled voltage duty value correspond to a first setting temperature, and the second temperature-controlled voltage value and the second temperature-controlled voltage duty value correspond to a second setting temperature.

3. The rotation speed control circuit according to claim 2, wherein when an environment temperature is higher than the first setting temperature, a third temperature-controlled voltage value and a third temperature-controlled voltage duty value correspond to the first setting temperature, and when the environment temperature is lower than the second setting temperature, a fourth temperature-controlled voltage value and a fourth temperature-controlled voltage duty value correspond to the second setting temperature.

4. The rotation speed control circuit according to claim 1, wherein the second setting data is a lower-bound pulse-width input duty value, and the third setting data is a lower-bound pulse-width output duty value.

5. The rotation speed control circuit according to claim 4, wherein the lower-bound pulse-width input duty value is a duty ratio corresponding to the pulse-width input signal.

6. The rotation speed control circuit according to claim 4, wherein the lower-bound pulse-width output duty value is a duty ratio corresponding to the pulse-width output signal.

7. The rotation speed control circuit according to claim 1, wherein the temperature-controlled voltage duty generator comprising:
an analog-to-digital converter, converting a temperature-controlled voltage received into a digital temperature-controlled voltage;
a first register, receiving and storing the first setting data; and
a first linear interpolation circuit, connected to the analog-to-digital converter and the first register, and the first linear interpolation circuit receiving the digital temperature-controlled voltage and retrieving the first setting data inside the first register, and executing a linear interpolation operation on the digital temperature-controlled voltage according to the first setting data so as to output the temperature-controlled voltage duty signal.

8. The rotation speed control circuit according to claim 1, wherein the pulse-width signal duty generator comprising:
a duty counter, receiving the pulse-width input signal and a first clock signal, and accordingly converting the pulse-width input signal into a digital pulse-width input signal;

a second register, receiving and storing the second setting data; and a second linear interpolation circuit, connected to the duty counter and the second resister, and the second linear interpolation circuit receiving the digital pulse-width input signal and retrieving the second setting data in the second register, and executing the linear interpolation operation on the digital pulse-width input signal according to the second setting data so as to output the pulse-width duty signal.

9. The rotation speed control circuit according to claim 1, wherein a rotation speed signal generator comprising:

a third register, receiving and storing the third setting data;

an adder, connected to the multiplier and the third register, the adder executing an addition operation on the mixing-duty signal received and the third setting data in the third register retrieved to set a minimum output duty ratio, and accordingly outputting a digital pulse-width output signal; and a duty-to-analog converter, connected to the adder, and the duty-to-analog converter receiving the digital pulse-width output signal and a second clock signal, and accordingly converting the digital pulse-width output signal into the pulse-width output signal.

10. A heat dissipation system, comprising:
the rotation speed control circuit according to claim 1;
a motor, connected to the rotation speed control circuit, and the motor receiving the pulse-width output signal and accordingly adjusting a work of adjusting rotation speed; and
a load, connected to the motor, wherein the load is for a heat dissipation work.

11. A rotation speed control method, comprising:
receiving a temperature-controlled voltage and a pulse-width input signal;
converting the temperature-controlled voltage into a digital temperature-controlled voltage and converting the pulse-width input signal into a digital pulse-width input signal;
executing a linear interpolation operation on the digital temperature-controlled voltage according to a first setting data so as to output a temperature-controlled voltage duty signal;

executing the linear interpolation operation on the digital pulse-width input signal according to a second setting data so as to output a pulse-width duty signal;

executing a multiplication on the temperature-controlled voltage duty signal and the pulse-width duty signal to output a mixing-duty signal;

receiving the mixing-duty signal and a third setting data and accordingly executing an operation of minimum output duty ratio; and outputting the pulse-width output signal, wherein the rotation speed control method is for the rotation speed control circuit according to claim 1 or the heat dissipation system according to claim 10.

12. The rotation speed control method according to claim 11, wherein the first setting data includes a first temperature-controlled voltage value, a first temperature-controlled voltage duty value, a second temperature-controlled voltage value and a second temperature-controlled voltage duty value, wherein the first temperature-controlled voltage value and the first temperature-controlled voltage duty value correspond to a first setting temperature, and the second temperature-controlled voltage value and the second temperature-controlled voltage duty value correspond to a second setting temperature.

13. The rotation speed control method according to claim 12, wherein when the environment temperature is higher than the first setting temperature, a third temperature-controlled voltage value and a third temperature-controlled voltage duty value correspond to the first setting temperature, and when the environment temperature is lower than the second setting temperature, a fourth temperature-controlled voltage value and a fourth temperature-controlled voltage duty value correspond to the second setting temperature.

14. The rotation speed control method according to claim 11, wherein the second setting data is a lower-bound pulse-width input duty value, and the third setting data is a lower-bound pulse-width output duty value.

15. The rotation speed control method according to claim 14, wherein the lower-bound pulse-width input duty value is a duty ratio corresponding to the pulse-width input signal.

16. The rotation speed control method according to claim 14, wherein the lower-bound pulse-width output duty value is a duty ratio corresponding to the pulse-width output signal.

* * * * *